Patented July 12, 1932

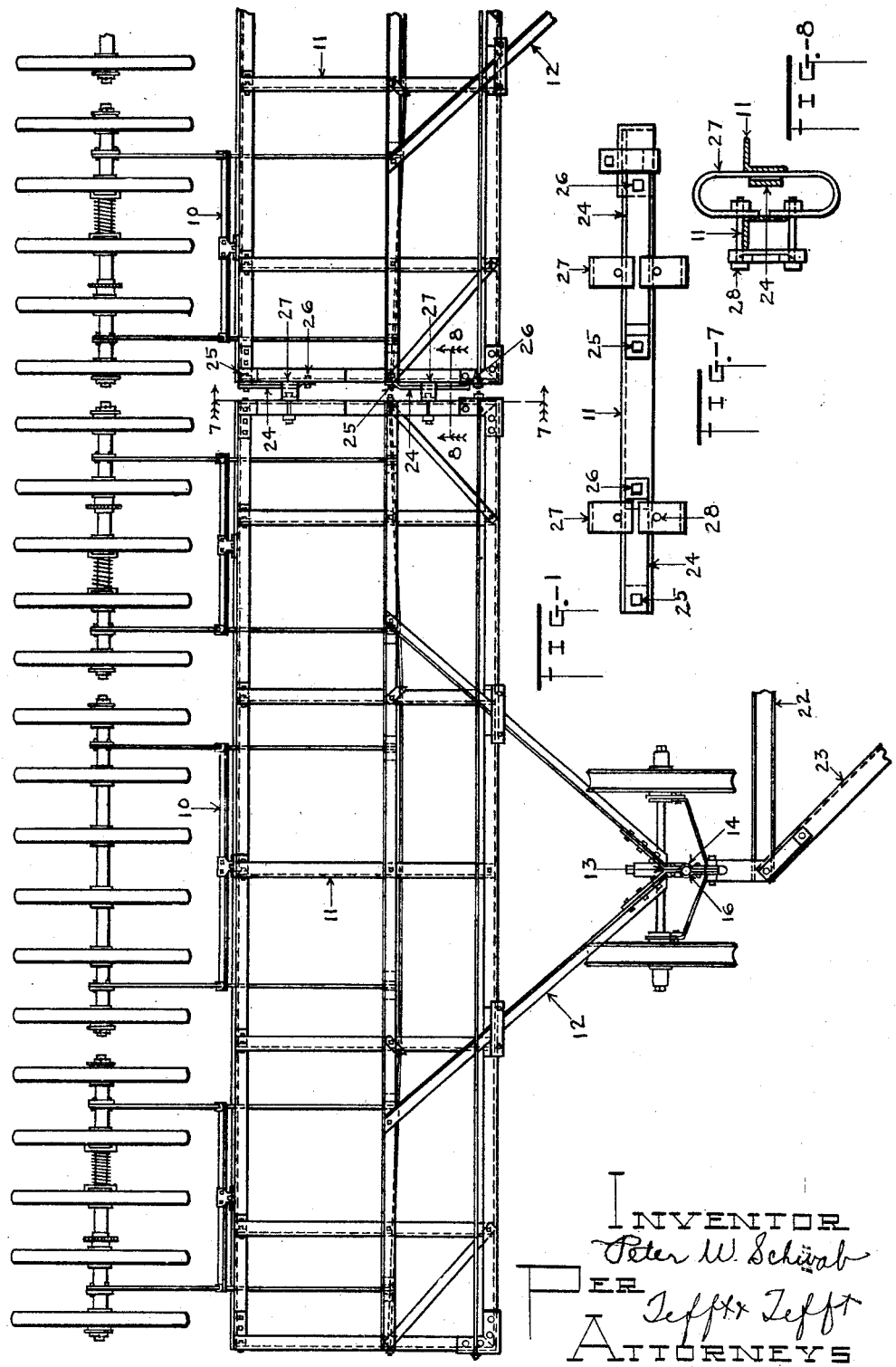

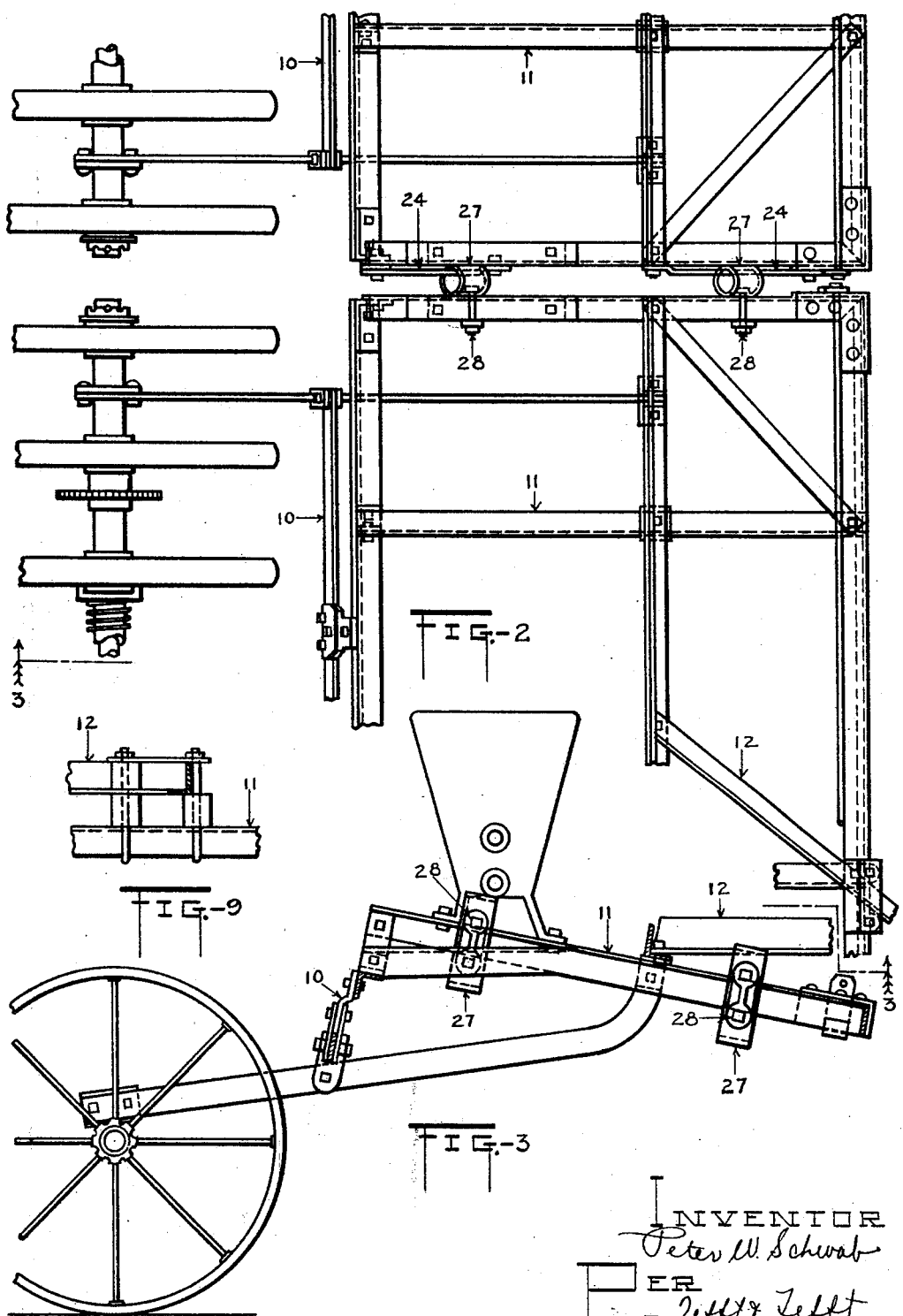

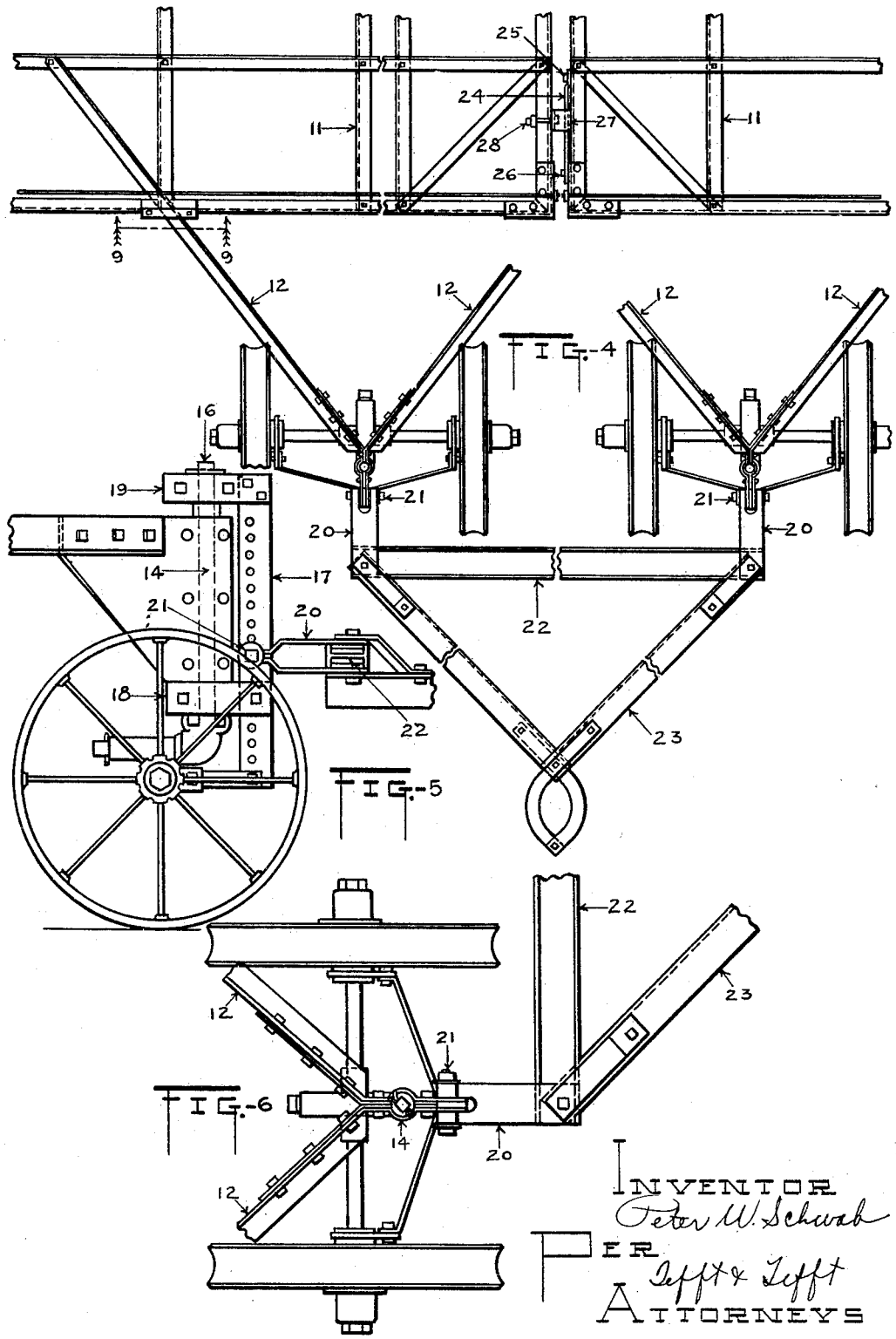

1,866,912

UNITED STATES PATENT OFFICE

PETER W. SCHWAB, OF PEORIA, ILLINOIS

DRILL HITCH MECHANISM

Application filed July 17, 1929. Serial No. 378,825.

This invention relates to drill hitch mechanism.

One of the objects of the invention is in the provision of a hitch mechanism for connecting multiple drills in such manner that they may be drawn through the field by a single power or tractor mechanism.

Another object lies in the provision of hitch mechanism for plural drill members, said hitch mechanism permitting the plural hitch members to follow automatically in the path of the tractor as well as compensate for ground irregularities.

A further object lies in the provision of hitch mechanism for drill members, the same permitting a plural number of drills to properly follow a tractor as well as being able to automatically compensate for ground irregularities.

Other objects will appear in the following specification taken in connection with annexed drawings, in which—

Fig. 1 is a plan view of the hitch mechanism;

Fig. 2 is an enlarged detail showing the manner of connecting the frame portion of the plural hitches;

Fig. 3 is a side elevational view taken on the line 3—3 of Fig. 2;

Fig. 4 is a plan view, showing the connecting mechanism for the hitch;

Fig. 5 is an enlarged detail and side elevation showing adjustable mechanism for tractor conveying means;

Fig. 6 is a detail view in plan of the truck mechanism and hitch connecting means;

Fig. 7 is a sectional view taken on the line 7—7 of Fig. 1;

Fig. 8 is another sectional view taken on the line 8—8 of Fig. 1;

Fig. 9 is a sectional view taken on the line 9—9 of Fig. 4.

Before referring to the drawings, it might be stated that drill members have heretofore been drawn through the field by either a tractor or by horse power. With the advent of the combines into the agricultural field, there came the consequent necessity of providing greater speed in the drill and seeding operation, by the conveyance of a plural number of drills and such transmission of the drills in a manner to follow the tractor in a natural manner, especially during the turning movement.

The applicant herein has been connected for many years with a prominent manufacturer of drills and seeders. Recognizing the necessity of having a plural number of drills drawn through the fields and following a considerable period of development, he finally devised the present hitch mechanism which permits conveyance of plural drill members through the field by a single tractor, at the same time permitting the drills to properly follow the tractor, as well as to compensate for the many irregularities in the ground.

Referring to the drawings, in Fig. 1 is a general disclosure of conventional drill mechanism. The seed boxes, disks and grain distributing mechanism have not been disclosed in the drawings in order to permit a clearer disclosure of the hitch mechanism, which is the basis for the present application. These drill members have been referred to generally as 10 and the frame portion thereof is designated 11, said frame portion obviously supporting the seed boxes, disks and grain distributing mechanism.

The conventional plural drill members 10 have the ordinary tractor hitch mechanism now to be described, attached thereto, the same comprising the forwardly projecting angle irons 12 fixedly secured to the frame 11 of the drill. The angle irons 12 merge, as at 13, at a forward point in such manner as to provide a cylindrical support 14 for an upwardly projecting pivot member 16.

In Fig. 5 of the drawings is shown a vertically apertured member 17 suitably supported by brackets 18 and 19 to the truck member. This apertured member 17 permits adjustability with a stub tongue portion 20, said tongue having the adjustable bolted connection 21 with the apertured member 17.

Obviously, such pivotal connection between the conventional tractor hitch and the truck is provided for each drill, although in the present drawings merely a single hitch and portions of another have been disclosed, due to the similarity of parts.

Now, turning to Fig. 4, the stub tongues 20 of adjacent drill members are shown held in a spaced fixed relationship by means of a jockey stick 22, the same having bolted connections with the forward ends of both of the stub tongues 20.

Any connecting means may be provided between the forward ends of the stub tongues and the tractor mechanism. In the present instance, an angle iron connecting and attaching means 23 has been shown. However, a chain or cable connection between the trucks and tractor might just as well be used.

The above describes not only the drill mechanism but also the manner of connecting adjacent drills and holding same apart at their forward ends. Now, with respect to the spacing of the drills at points intermediate their lengths, or rather between the frames of the drills themselves, the clearest disclosure is perhaps in Figs. 1, 2, 7 and 8.

Horizontally disposed metal strips 24 are bolted at their ends 25 and 26 respectively in a spaced relation to the side surface of the frame 11 of one of the adjacent drills. Loop members 27 have a dual bolted connection 28 with the opposing side of the frame of the adjacent drill. These loop portions 27 are flattened vertically as shown in Fig. 8, one side of the loop riding in the space formed by the particular attachment previously described of the horizontal strips 24 on the frame of the adjacent drill.

The above described plural connections between the side surfaces of adjacent drills includes such attachment mechanism as will permit a compensating movement of one of the drills induced by irregularities in the ground, irrespective of the position of the opposite drill member. In other words, this looped and spaced strap connection between the drills obviously permits the drills to move vertically with respect to each other as well as horizontally on a line in the direction of travel.

The fact that there is some considerable play between the loop and strap connecting means which normally holds the drills in a substantially fixed spaced manner allows a degree of rocking movement between the drills.

In Fig. 8 the loop and strap connection might possibly have been disclosed in a somewhat looser manner to permit even a greater degree of rocking movement. However, for the purposes of description, the same has not been shown as extremely loose because under ordinary circumstances only a slight degree of rocking action would be necessary to compensate for irregularities in the ground over which the plural drills are drawn in a unitary manner.

With respect to the operation of my hitch mechanism, for plural drill members, there should first be pointed out that the center of each drill is the pivotal centering point of each lateral end of the hitch. This particular spacing of the drills permits automatic and proper following of the multiple drill members behind the power means, which of course usually is a tractor.

Obviously, if the tractor turns to the right, looking in the direction of movement, the truck of the drill on the inside will cover in its turning movement considerably less distance than the drill on the outside, this being, of course, due to the particular spacing and pivoting of the drills. When the drills are drawn in a conventional manner through the fields and normally in a straight line, the irregularities in the ground will obviously raise portions of the adjacent drills at various points which will be automatically compensated for by the particular loop and strap connection between the drills. In other words, there is such connection between the sides of the drill frames as will permit movement of either drill without having such movement automatically transferred to the adjacent drill. It is apparent, also, that this particular manner of connecting dual drill members might well be extended to a plurality of such drills in the same manner and with substantially the same structure as shown herein.

What I claim is:

1. In a device of the class described, in combination, plural drill members having tractor hitch and pivoted truck members, hitch and connecting mechanism for said drills insuring proper travel of the drills through the field, irrespective of ground conditions, including a mechanism for spacing the tractor hitch and truck mechanism in such manner that the center of each drill is the pivotal centering point of the lateral ends of the hitch said mechanism including a loop and strap connection between the opposed inner sides of adjacent drills, for holding the drills in such position that there is an equal spacing between the furrow openers.

2. In a device of the class described, in combination, plural drill members, hitch and connecting mechanism for said drill including connecting means between the opposed inner sides of adjacent drills for holding the drills in such position that there is an equal spacing between the furrow openers, said connecting means including a sliding strap connection insuring proper travel of the adjacent drills through the field, irrespective of ground conditions.

In testimony whereof I have hereunto affixed my signature.

PETER W. SCHWAB.